United States Patent [19]

Segawa et al.

[11] Patent Number: 4,560,857

[45] Date of Patent: Dec. 24, 1985

[54] CONSUMABLE ELECTRODE TYPE ARC WELDING APPARATUS HAVING A SELECTABLE START CURRENT

[75] Inventors: Hirohisa Segawa; Motoe Kitani; Takao Shimizu; Masanori Mizuno, all of Aichi, Japan

[73] Assignee: Mitsubishi Denki Kabushiki Kaisha, Tokyo, Japan

[21] Appl. No.: 581,524

[22] Filed: Feb. 21, 1984

[30] Foreign Application Priority Data

Feb. 21, 1983 [JP] Japan .................................. 58-27263
Feb. 21, 1983 [JP] Japan .................................. 58-27264

[51] Int. Cl.⁴ .............................................. B23K 9/10
[52] U.S. Cl. .............................. 219/130.21; 219/130.5; 219/137 PS
[58] Field of Search .................. 219/130.21, 130.31, 219/130.32, 130.33, 130.5, 136, 137.71, 137 PS, 130.4

[56] References Cited

U.S. PATENT DOCUMENTS

| | | | |
|---|---|---|---|
| 3,141,085 | 7/1964 | Manz | 219/137 PS |
| 3,213,262 | 10/1965 | Marchand | 219/137.71 |
| 3,622,744 | 11/1971 | Main et al. | 219/137 PS |
| 4,109,130 | 8/1978 | Oku | 219/130.5 |
| 4,427,874 | 1/1984 | Tabata et al. | 219/130.31 |

FOREIGN PATENT DOCUMENTS

| | | |
|---|---|---|
| 2007712 | 8/1970 | Fed. Rep. of Germany . |
| 2455581 | 12/1975 | Fed. Rep. of Germany . |
| 3025225 | 1/1981 | Fed. Rep. of Germany . |
| 57-202971 | 12/1982 | Japan . |
| 1448192 | 9/1976 | United Kingdom . |

*Primary Examiner*—Clifford C. Shaw
*Attorney, Agent, or Firm*—Sughrue, Mion, Zinn Macpeak & Seas

[57] ABSTRACT

A consumable electrode type arc welding apparatus in which arcing can be positively started under a variety of welding conditions. A start current detector selects a predetermined limited start current according to the welding conditions. A start current period setting unit sets a start current period, also in accordance with the welding conditions. A start current control circuit supplies the predetermined limited start current to the workpiece and the wire electrode for the predetermined period of time at the start of arcing.

15 Claims, 23 Drawing Figures

Elementary wiring diagram

CONSUMABLE ELECTRODE TYPE ARC WELDING APPARATUS HAVING A SELECTABLE START CURRENT

BACKGROUND OF THE INVENTION

The present invention relates to consumable electrode type arc welding apparatuses. More particularly, the invention relates to electrode type arc welding apparatuses in which, while a wire electrode is being fed towards a workpiece to be welded, an arc is generated between the wire electrode and the workpiece to weld the latter.

Heretofore, a consumable electrode type arc welding apparatus of this type is started as follows:

A DC voltage is applied between a wire electrode wound on a reel and a workpiece to be welded, and the wire electrode is fed towards the workpiece by a wire electrode feeding device at a constant speed. When the wire electrode 10 is brought into contact with the surface of the workpiece 12 as shown in FIG. 1(A), a start current flows to the workpiece 12 from the electrode 10. The reason why the start current is caused to flow at the start of the welding operation is that it is necessary to generate a small arc between the end of the wire electrode 10 and the workpiece 12 to melt a certain length of the end portion of the wire electrode and to thereby generate an arc having a desired arc length from the entire end face of the wire electrode 10.

In the conventional arc welding apparatus, the start current rises at a predetermined rate irrespective of welding conditions such as wire diameter and welding current, and therefore the start current is so controlled that a predetermined amount of current is allowed to flow in a predetermined period of time. For instance, as shown in FIG. 2, the current rise curve is so determined that a start current $I_1$ flows at a time instant $T_1$ which occurs a predetermined period of time after the time instant $T_0$ at which the wire electrode 10 is brought into contact with the surface of the workpiece 12. The case where the arc is generated in a relatively short period of time is indicated by the broken line in FIG. 2. In this case, at the time instant $T_5$ a small arc is generated between the end of the wire electrode 10 and the workpiece 12. As the short-circuited state becomes the arcing state, the current decreases gradually. When the current decreases to a value $I_2$ at the time instant $T_6$, the flow of current becomes steady; that is, a welding current $I_2$ having a predetermined value flows. In the case when the arc is generated in an extremely short time as described above, the arc generating current $I_3$ is small and therefore very little sputtering occurs at the start of the welding operation.

A specific example of a conventional arc welding apparatus is shown in FIG. 3. In this apparatus, the three-phase alternating current input is subjected to voltage drop by a step-down transformer $T_1$, the three-phase alternating current output of which is subjected to rectification and phase control by a main circuit thyristor unit to provide a DC output. The DC output thus provided is coupled out of the welding power source through a DC reactor $L_2$; that is, it is supplied between the wire electrode of a welding torch and a workpiece to be welded through a wire feeding device. In this case, the phase control angle (i.e., the DC output value) of the main circuit thyristor unit is determined by a voltage adjustment value set by an operating control head, and the speed of feeding of the wire electrode is determined by a current adjustment value set by the operating control head. The rate of rise of the welding current is determined by the output voltage preset and the inductance of the DC reactor $L_2$; however, only for the start, is the welding control circuit operated to separately determine the output voltage so that it is higher than the ordinary welding voltage. A predetermined period of time after the arc has been generated, an instruction is issued to return the output voltage to the voltage adjustment value set by the operating control head. Thus, at the start of the welding operation, the gradient of rise of the current is completely determined by the output voltage set at the start and the inductance of the DC reactor $L_2$. The falling waveform of the current is fully determined by the value of the welding current provided when the arc is generated after the wire electrode has contacted the workpiece and by the inductance of the DC reactor $L_2$, as shown in FIG. 4.

In the conventional apparatus, in order to positively generate an arc, control is so made that a sufficiently long period of time is provided for the initial generation of the arc; that is, an excessively large short-circuiting current flows for the period of time between the time instants $T_0$ and $T_1$. Therefore, even when the end of the wire electrode 10 is brought into contact with the surface of the workpiece 12 as shown in FIG. 1(A), the arc will not generate immediately, and instead is generated at the time instant $T_1$. In this case, the arc is not produced between the workpiece 12 and the end of the wire electrode 10. That is, the current has a considerably large value $I_1$, as a result of which the wire electrode can be fragmented by a fusing action while producing arcs as shown in FIG. 1(B). In such a case, the wire electrode 10 is burnt away. That is, the conventional apparatus is disadvantageous in that the arcing is not positively started.

Furthermore, in the conventional apparatus, a predetermined amount of short-circuiting current is allowed to flow irrespective of the welding conditions. Therefore, the conventional apparatus suffers from a problem that, when a wire electrode of a different diameter from the one previously employed is used or the welding current value is changed, the arcing will not be positively started. That is, the optimum value of the short-circuiting current is determined by the diameter of the wire electrode, and the start current should be increased with the wire diameter. Similarly, when the welding current is increased, it is necessary to increase the start current. Thus, when generation of the arc is delayed, an excessively large start current increasingly causes sputtering at the start, accelerates the creeping of the arc, and causes a burn back phenomenon frequently whereby the electrode wire 10 is welded to a tip (not shown) used for feeding the electrode wire. In this case also, the arcing cannot be positively started.

In order to overcome this difficulty, a method of controlling the start current according to the welding conditions has been proposed in the art. However, the method is still disadvantageous in that, in a conventional thyristor control system, the start current varies as shown by the characteristic curve of FIG. 2. Therefore, if the peak value of the start current is set to be small, the arc is generated from only a part of the end of the wire electrode. In other words, the arc is not produced from the entire end face of the wire electrode 10. Thus, the produced arc is unstable and is therefore liable to extinction.

SUMMARY OF THE INVENTION

In view of the foregoing, an object of this invention is to provide a consumable electrode type arc welding apparatus in which arcing can be positively started for various welding conditions.

The foregoing object and other objects of the invention have been achieved by the provision of a consumable electrode type arc welding apparatus in which, while a wire electrode is fed to a workpiece to be welded, arcs are generated between the wire electrode and the workpiece to weld the latter, and which, according to the invention, includes a start current selector for selecting a predetermined limited start current according to welding conditions, a start current period setting unit for setting a start current period according to the welding conditions, and a start current control circuit for supplying the predetermined limited start current to the workpiece and the wire electrode for the predetermined period of time at the start of arcing.

DESCRIPTION OF THE PREFERRED EMBODIMENTS

Figure 1A:
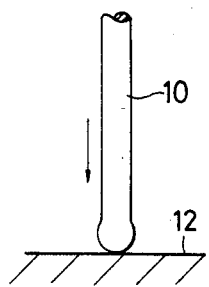
FIG. 1(A) shows an electrode being brought into contact with a workpiece.
Figure 1B:
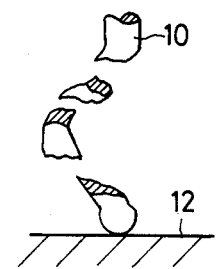
FIG. 1(B) shows the shattering of the wire electrode of FIG. 1(A) due to a fusing action.
Figure 2:
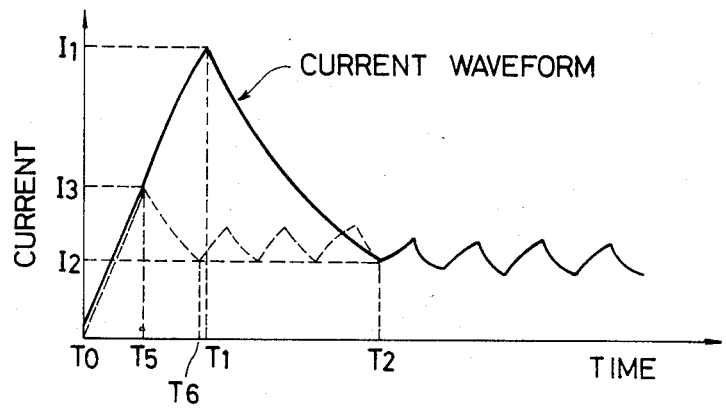
FIG. 2 shows a current rise curve determined so that a start current $I_1$ flows at a time instant $T_1$ occurring a predetermined time instant after the wire electrode is brought into contact with the surface of a workpiece.
Figure 4:
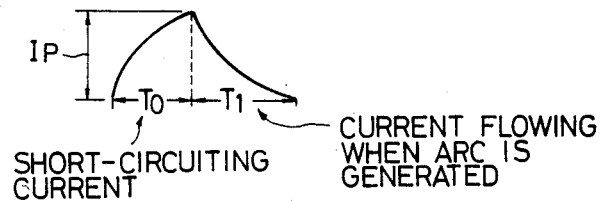
FIG. 4 is a waveform diagram showing a welding current waveform determined by the value of the welding current provided when the arc is generated after the wire elecrode has contacted the workpiece and by the inductance of a DC reactor.
Figure 3:
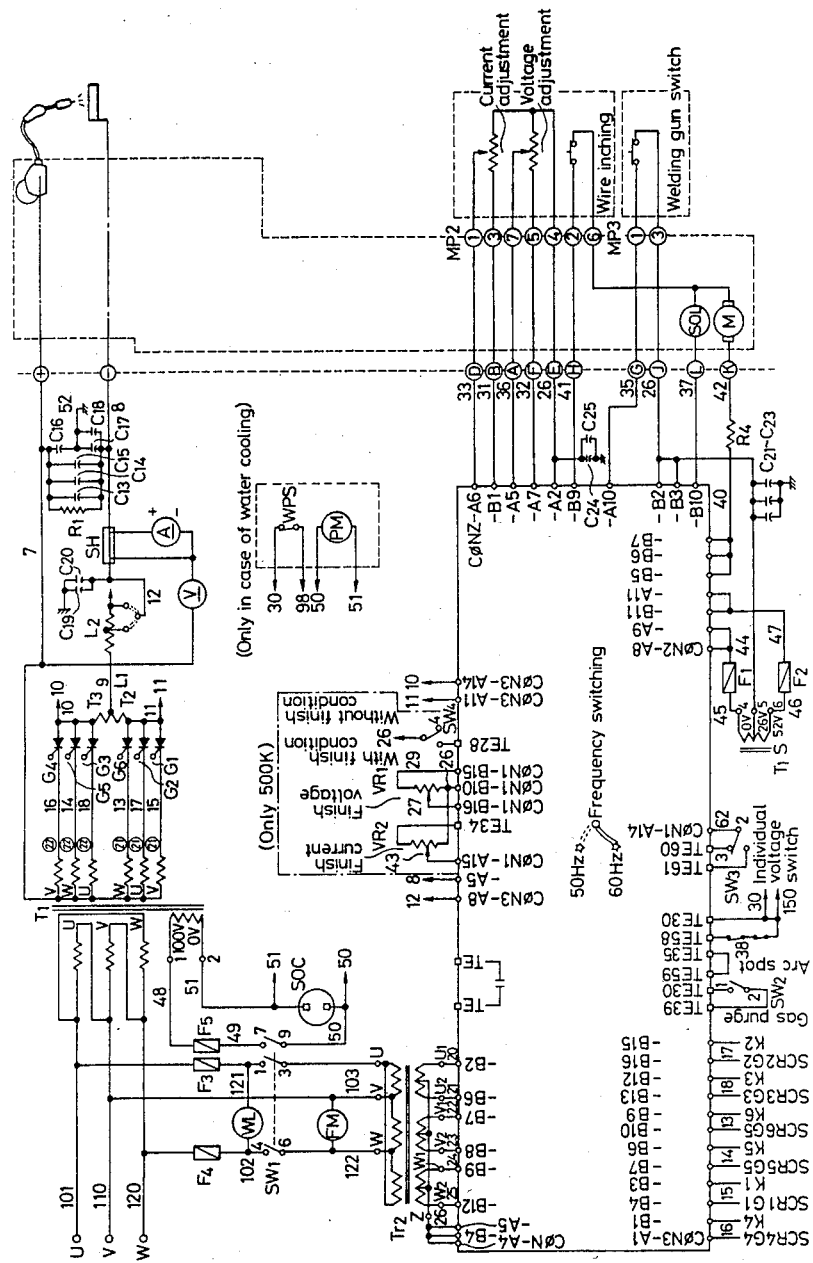
FIG. 3 is a circuit diagram of a conventional arc welding apparatus.
Figure 5:
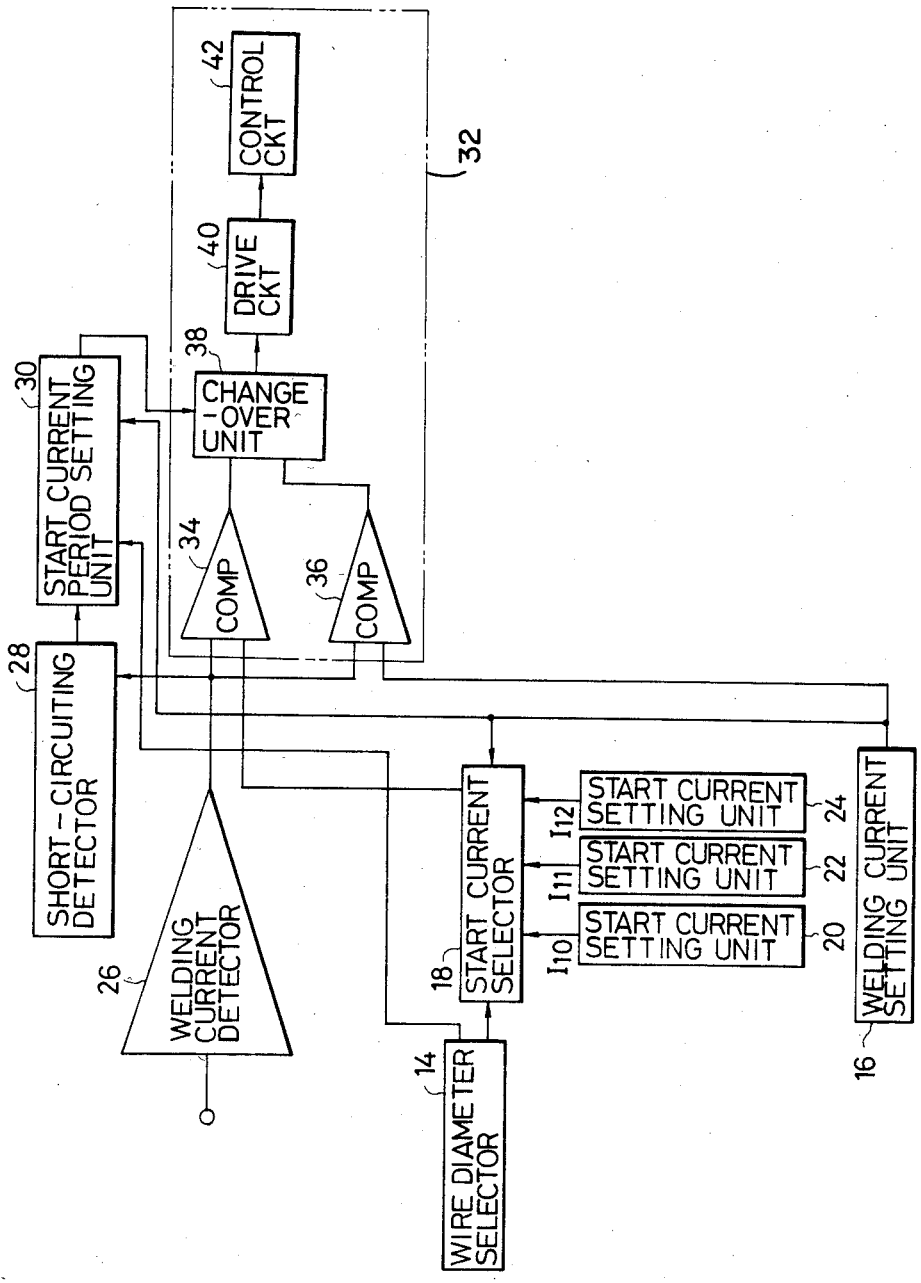
FIG. 5 is a block diagram of a consumable electrode type arc welding apparatus constructed in accordance with a first embodiment of the invention.

A first preferred example of a consumable electrode type arc welding apparatus according to the invention is as shown in FIG. 5.

As shown in FIG. 5, the apparatus has a wire diameter selector 14 for selecting a wire electrode diameter most suitable for a workpiece 12 to be welded. A welding current value is substantially in proportion to a wire feeding speed. As the wire feeding speed is increased, the welding current value is increased. Accordingly, the apparatus has a welding current setting unit 16 for providing the optimum welding current value according to the wire feeding speed selected. The apparatus is so designed that the wire diameter selector 14 and the welding current setting unit 16 are operated before a welding operation is started.

The apparatus has a start current selector 18 to select a limited start current determined according to welding conditions such as the wire diameter and welding current. The start current selector 18, according to the wire diameter and the welding current value determined by the wire diameter selector 14 and the welding current setting unit 16, selects the best one of the start current values $I_{10}$, $I_{11}$ and $I_{12}$ which have been determined by start current setting units 20, 22 and 24, respectively.

The value of the welding current which is applied to the wire electrode 10 is detected by a welding current detector 26, the output detection signal of which is supplied to a short-circuiting detector 28. The detector 28 detects the occurrence of short-circuiting from the detection signal applied thereto.

The apparatus further includes a start current period setting unit 30 for setting a period of time for which the start current flows according to the welding conditions. The unit 30, according to the wire diameter and the welding current value provided respectively by the wire diameter selector 14 and the welding current setting unit 16, sets a start current period most suitable for those welding conditions after the short-circuiting detector 28 has detected the occurrence of short-circuiting.

The start current value and the short-circuiting current period, which are provided according to the welding conditions, are determined by taking the following into consideration: If the start current is set to a large value, then the resulting sputtering is so great that the wire electrode is broken into pieces as in the conventional apparatus. Therefore, the start current value should be set to the minimum value which can produce arcing when the end of the wire electrode 10 is brought into contact with the surface of the workpiece 12. If the start current value is smaller than the minimum value, with the wire electrode 10 and the workpiece 12 short-circuited and the start current flowing continuously, the wire electrode 10 will be heated by resistance heating and sputtering will occur similar to the conventional apparatus. When the start current is limited to the minimum value which starts generating arcing, the arc thus generated is unstable. Accordingly, in order to stabilize the arc without causing it to extinguish, the start current period should be a period of time during which the end portion of the wire electrode 10 is molten without causing much sputtering to thus allow the arc to burn the wire electrode through a predetermined length to obtain a desired arc length, thereby to produce a stable arc over the entire end face of the wire electrode 10.

The apparatus further includes a start current control circuit 32 for allowing the limited start current to flow from the wire electrode 10 to the workpiece at the start of arcing, and thereafter to obtain the steady state. The start current control circuit 32 is composed of a comparator 34 which receives the start current selected by the start current selector 18 and a current corresponding to the welding current detected by the welding current detector 26. The comparator 34 supplies a control current until the welding current value reaches a selected current value. The start current control circuit 32 further includes a comparator 36 which receives a current corresponding to the welding current set by the welding current setting unit 16 and the current corresponding to the welding current detected by the welding current detector 26. The comparator 36 supplies a control current until the welding current value reaches a preset welding current value.

The output terminals of the comparators 34 and 36 are connected to a change-over unit 38 used for switching between the arc start state and the steady state. At the start of arcing, the change-over unit 38 supplies the control current from the comparator 34 through a drive circuit 40 to a control circuit 42 for a period of time which is set by the start current period setting unit 30. During the steady-state operation provided by a switching action thereafter, the change-over unit 38 supplies the control current from the comparator 36 through the drive circuit 40 to the control circuit 42. The control circuit 42 has a transistor 44. In the arc welding apparatus, current flowing from the drive circuit 40 to the base of the transistor 44 is controlled to control the current which flows from the wire electrode 10 to the workpiece 12.

The operation of the arc welding apparatus thus arranged will be described.

Before the start of arcing, the wire diameter selector 14 is manually operated to select the wire diameter of the wire electrode 10, and the welding current setting unit 16 is operated to set the welding current value which is most suitable for the wire feeding speed.

Figure 6A:
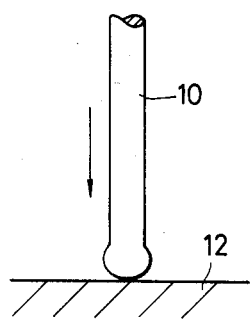
FIG. 6(A) shows, similar to FIG. 1(A), a wire electrode being brought into contact with a workpiece.
Figure 7:
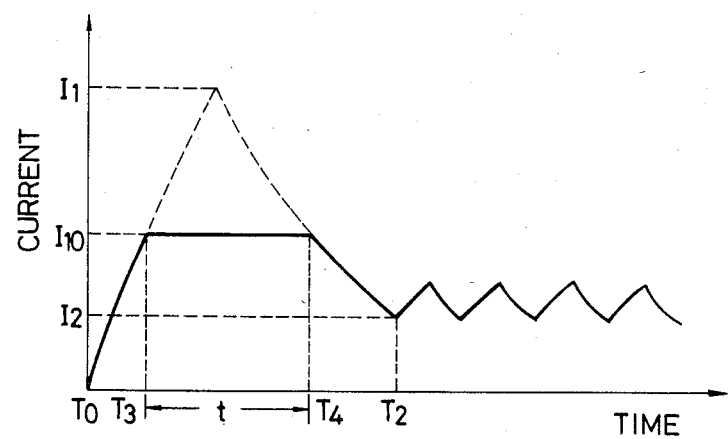
FIG. 7 is a waveform diagram used for explaining the operation of the apparatus of FIG. 5.

The wire electrode 10 having the diameter thus selected is fed to the workpiece 12 at a predetermined speed until it is brought into contact with the surface of the workpiece 12 as shown in FIG. 6(A), to thus cause the start current to flow. At the start of arcing, according to the wire diameter and the welding current value which have been determined respectively by the wire diameter selector 14 and the welding current setting unit 16, the start current selector 18 selects one of the start currents $I_{10}$ through $I_{12}$ set respectively by the start current setting units 20, 22 and 24 which is the most suitable for these welding conditions (for instance the start current $I_{10}$), and supplies a selected current to the comparator 34. The short-circuiting detector 28 detects, from the welding current detected by the welding current detector 26, the occurrence of short-circuiting between the wire electrode 10 and the workpiece 12, and applies the short-circuiting detection signal to the start current period setting unit 30. The comparator 34 compares the selected current from the start current selector 18 with the welding current from the welding current detector 26 and supplies the control current to the change-over unit 38 until the welding current becomes equal to the selected current. At the start of arcing, the change-over unit 38 is operated to supply the control current from the comparator 34 through the drive circuit 40 to the control circuit 42 and the transistor 44 in the control circuit 42 according to the current thus supplied, causing the start current ($I_{10}$) to flow from the wire electrode 10 to the workpiece 12 at the time instant $T_3$ as shown in FIG. 7. The start current period setting unit 30, according to the wire diameter and the welding current which have been determined respectively by the wire diameter selector 14 and the welding current setting unit 16, sets the start current period t which is the most suitable for these welding conditions and applies a change-over holding signal to the change-over until 38 until the time instant $T_4$ at which the flow of the start current $I_{10}$ is suspended in response to the short-circuiting detection signal. Thus, the predetermined start signal $I_{10}$ flows from the wire electrode 10 to the workpiece 12 for the period t between the time instants $T_3$ and $T_4$, as indicated in FIG. 7.

At the time instant $T_4$, the start current period setting unit 30 applies a switching signal to the change-over unit 38 so that the latter is operated to supply the control signal from the comparator 36 through the drive circuit 40 to the control circuit 42. Thus, the arc start state has been switched over to the steady state.

Figure 6B:
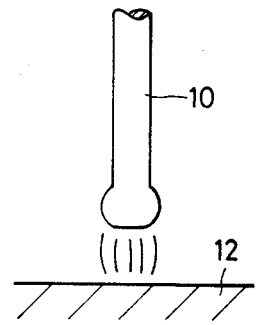
FIG. 6(B) shows a proper arcing state between the end of the wire electrode and the workpiece.

The comparator 36 compares the current corresponding to the welding current $I_2$ set by the welding current setting unit 16 with the current corresponding to the welding current detected by the welding current detector 26 and supplies the control current through the drive circuit 40 to the control circuit 42 until the welding current becomes equal to the set welding current $I_2$. Accordingly, the welding current $I_2$ flows continuously from the wire electrode 10 to the workpiece 12 so that arcs having a predetermined arc length are generated between the entire end face of the wire electrode 10 and the workpiece 12, as shown in FIG. 6(B).

In FIG. 7, the time instant at which the wire electrode 10 and the workpiece 12 are positioned so that arcs are generated therebetween occurs between the time instants $T_0$ and $T_4$. However, in the case when arcing starts very satisfactorily, i.e., the arcs are generated in a very short time, the time instant occurs between the time instants $T_0$ and $T_3$. The period of time between the time instant at which arcs are produced and the time instant $T_4$ is necessary for stabilizing the arcs. By burning back the wire electrode 10 to the extent that a suitable arc length is obtained, the steady arcing attained after the time instant $T_4$ can be reached immediately.

If it takes a relatively long period of time before arcs are generated and the wire electrode 10 and the workpiece 12 are maintained short-circuited with each other even after the time instant $T_3$, the wire electrode will be broken by fusing so that arcs are produced between the time instants $T_3$ and $T_4$. However, since the current at the generation of arcing, unlike the conventional case, has a sufficiently limited value $I_{10}$, no great amount of sputtering which may shatter the wire will occur, and the wire electrode will not be excessively burnt back. Thus, the occurrence of the burn-back phenomenon whereby the tip is welded to the wire electrode 10 is prevented.

Figure 8:
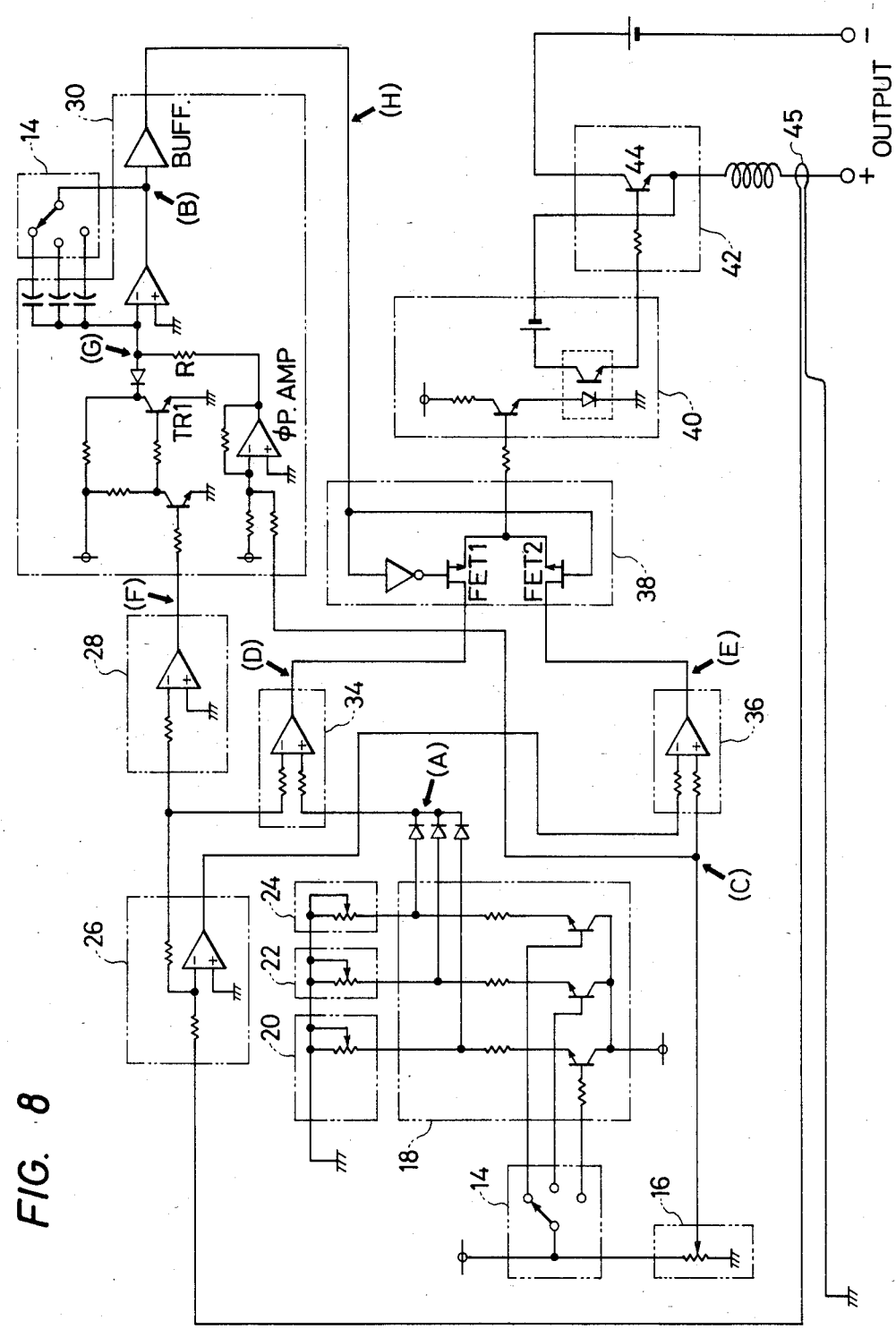
FIG. 8 is a detailed circuit diagram of the apparatus of FIG. 5.
Figure 9:
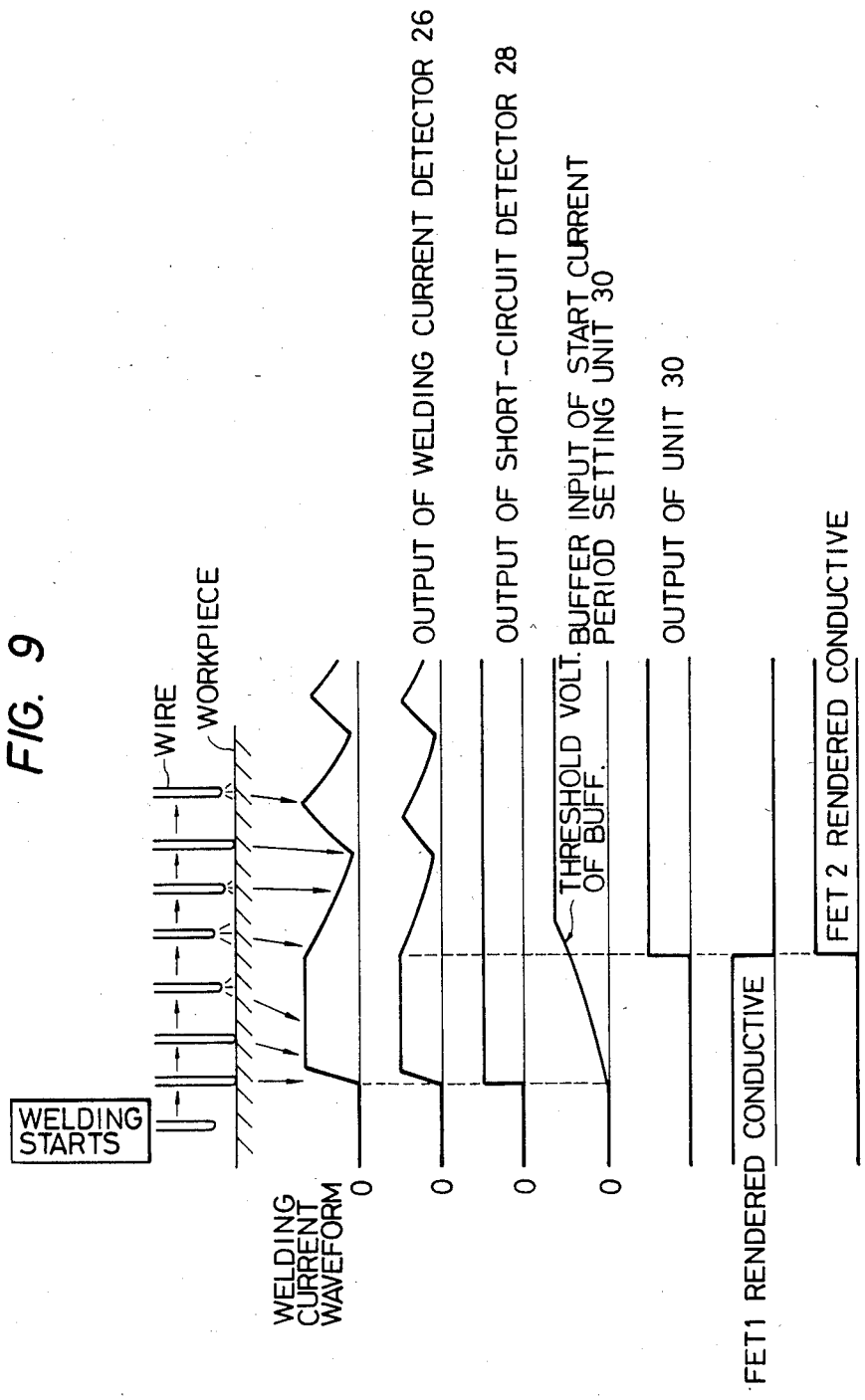
FIG. 9 is a waveform diagram used to explain the operation of the apparatus of FIG. 5.

The arc welding apparatus shown in FIG. 5 is illustrated in FIG. 8 in more detail. The operation of the apparatus shown in FIG. 8 will be described.

When the wire diameter selector 14 selects one wire diameter, a transistor in the start current selector 18 is turned on. As a result, a predetermined value (A) set by one of the start current selectors 20, 22 and 24 is applied to one input terminal of the comparator 34.

At the start of welding, the welding current is not applied yet. Therefore, the output of the comparator 34 is at the high level. The output of the short-circuiting detector 28 is at the low level, a circuit point (G) of the start current period setting unit 30 is at the low level, and the output of the unit 30 is at the low level. As a result, a field-effect transistor FET1 of the change-over unit 38 is rendered conductive, and the drive circuit 40 is driven by the output (D) of the comparator 34. As the transistor 44 in the control circuit 42 is driven by the output of the drive circuit 40, the transistor 44 is turned on and off by the output (D) of the comparator 34 during the period for which the output (H) of the start current period setting unit 30 is maintained at the low level. In other words, during this period, the welding current is controlled according to the value set by the start current setting unit selected even after the welding current starts flowing.

When the welding current flows, as the amplification factor of the short-circuit detector 28 is considerably large (assumed essentially infinite), the output (F) of the detector 28 is raised to the high level by the output of the welding current detector 26 immediately. As a result, a transistor TR1 in the start current period setting unit 30 is turned off so that, according to the value set by the welding current setting unit 16, one capacitor is charged through a resistor (R). In this operation, when the voltage at a circuit point (B) reaches a certain value in a predetermined period of time T, the output (H) of the unit 30 is raised to the high level. At the same time, in the change-over unit 38, the transistor FET1 is rendered nonconductive while the transistor FET2 is rendered conductive. As a result, the drive circuit 40, and accordingly the transister 44, is driven by the output (E) of the comparator 36.

In this operation, the above-described capacitor is selected by the wire diameter selector and the switching time of the comparators 34 and 36 is determined according to the wire diameter. The capacitor charging time depends on the value set by the welding current setting unit 16, and therefore the above-described switching time depends on the value set by the welding current setting unit 16.

In FIG. 8, an amplifier $\phi$P·AMP receives the aforementioned set value (C) to provide an output (supply voltage − set value (C)). Therefore, the capacitor charging time is inversely proportional to the set value mentioned above.

Summarizing the above-described operations, when the wire electrode contacts the workpiece at the start of the welding operation, the welding current starts flowing. However, for a period of time determined by the wire diameter and the welding current set value, the start current having the peak value determined by the wire diameter flows as the welding current, and thereafter the welding current determined by the welding current set value flows.

In FIG. 8, reference numeral 45 designates a current transformer (CT).

The start current period setting unit 30 will be described in more detail. The unit 30 is constructed as shown in FIG. 10, and it operates as shown in FIG. 11.

Figure 10:
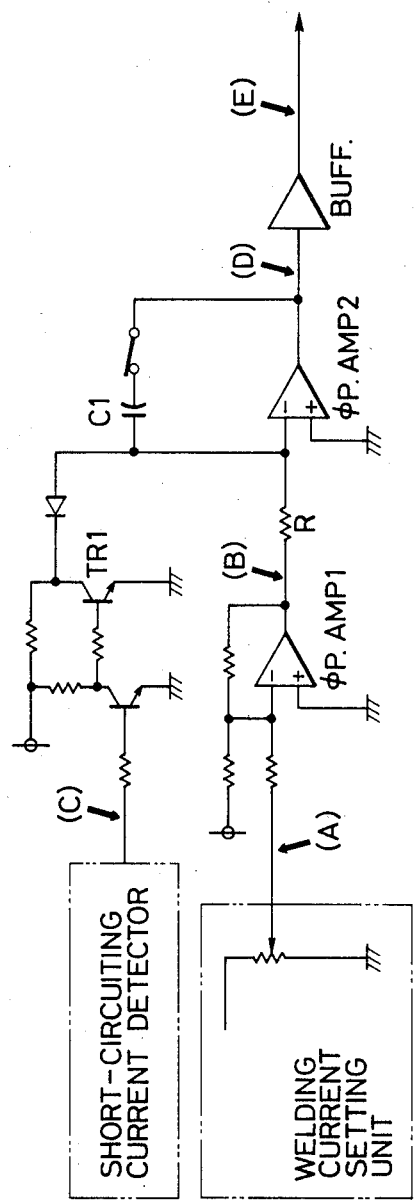
FIG. 10 is a detailed circuit diagram of a start current period setting unit utilized in the apparatus of FIG. 5.
Figure 11:
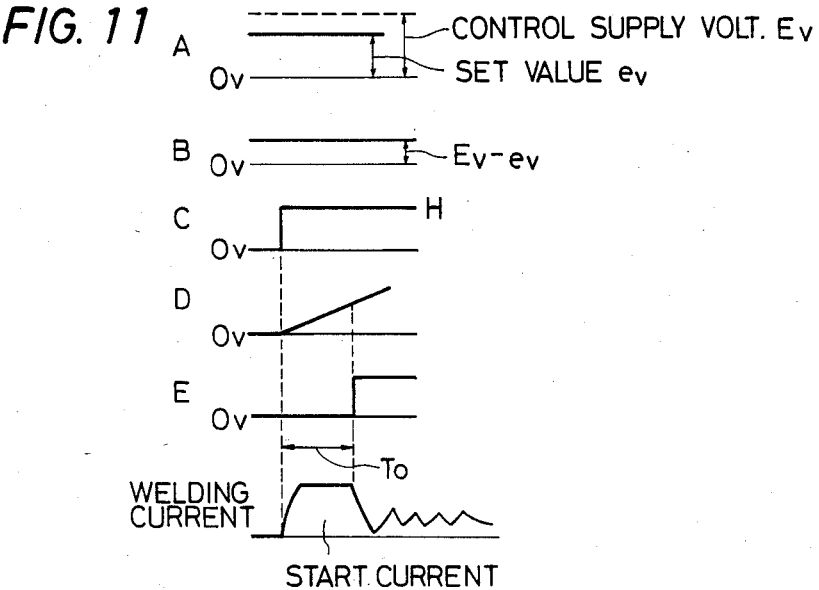
FIG. 11 is a waveform diagram used to explain the operation of the unit shown in FIG. 10.

In FIG. 10, if the set value (A) provided by the welding current setting unit is represented by ev, the output (B) of an amplifier $\phi$P AMP1 can be expressed by $(E-e)v$ when a control supply voltage Ev is applied. When, at the start of the welding operation, the wire electrode contacts the workpiece to allow the short-circuiting current to flow therebetween, the output (C) of the short-circuiting current detecting circuit is raised to the high level, and the transistor TR1 is turned off. As a result, the capacitor $C_1$ is charged through the resistor R by a current having a value $(E-e)/R$ in a constant current mode. Therefore, the output (D) of an amplifier $\phi$P·AMP2 is gradually increased. When the output (D) exceeds the threshold level of the buffer, the output of the latter is raised to the high level. The period of time $T_0$ which elapses from the instant that the short-circuiting current starts flowing until the output (D) of the buffer is raised to the high level, as described above, is the start current period. It can be readily understood that the period of time time $T_0$ is increased as the welding current set value ev increases because $(E-e)/R$ is decreased and the time required for charging $C_1$ is increased.

Figure 12:
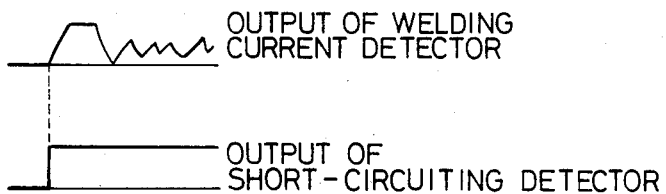
FIG. 12 shows a waveform of the output of a welding current detector.
Figure 13:
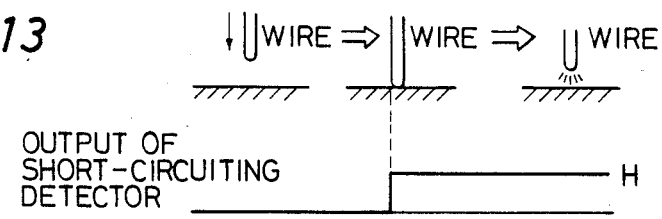
FIG. 13 is a diagram used to explain the operation of a short-circuiting detector.

As shown in FIG. 12, the waveform of the output of the welding current detector 26 is similar to that of the actual welding current, and the output of the short-circuiting detector is a binary signal having high and low logic signal levels. The short-circuiting detector operates to provide a detection signal (high level) when the wire electrode contacts the workpiece and the current starts flowing therebetween at the start of welding operations. In other words, the short-circuiting detector outputs a high level signal as long as the welding current is flowing, even when arcs are being produced during welding (not short-circuiting), as indicated in FIG. 13. Thus, it is essential that the circuit operate correctly at the start of welding.

As is apparent from the above description, in the apparatus of the invention, the start current value and the start current period are determined according to the diameter of the wire electrode 10 and the welding current value. Therefore, in the apparatus, unlike the conventional apparatus, no great amount of sputtering due to fusing occurs, and the arc starting operation is positively achieved according to the welding conditions without causing the burn back phenomenon.

In the above-described apparatus, the start current selector 18 and the start current period setting unit 30 determine the start current and the start current period, respectively, according to both the wire diameter and welding current; however, they may be so designed as to determine those data according to one of the welding conditions.

As is clear from the above description, the first embodiment of an arc welding apparatus according to the invention includes the start current selector for selecting a predetermined limited start current according to the welding conditions, the start current period setting unit for setting a start current period according to the welding conditions, and the start current control circuit for supplying, at the start of arcing, the predetermined limited start current to the workpiece and the wire electrode for the predetermined period, whereby arcing can be positively started according to the welding conditions.

Figure 14:
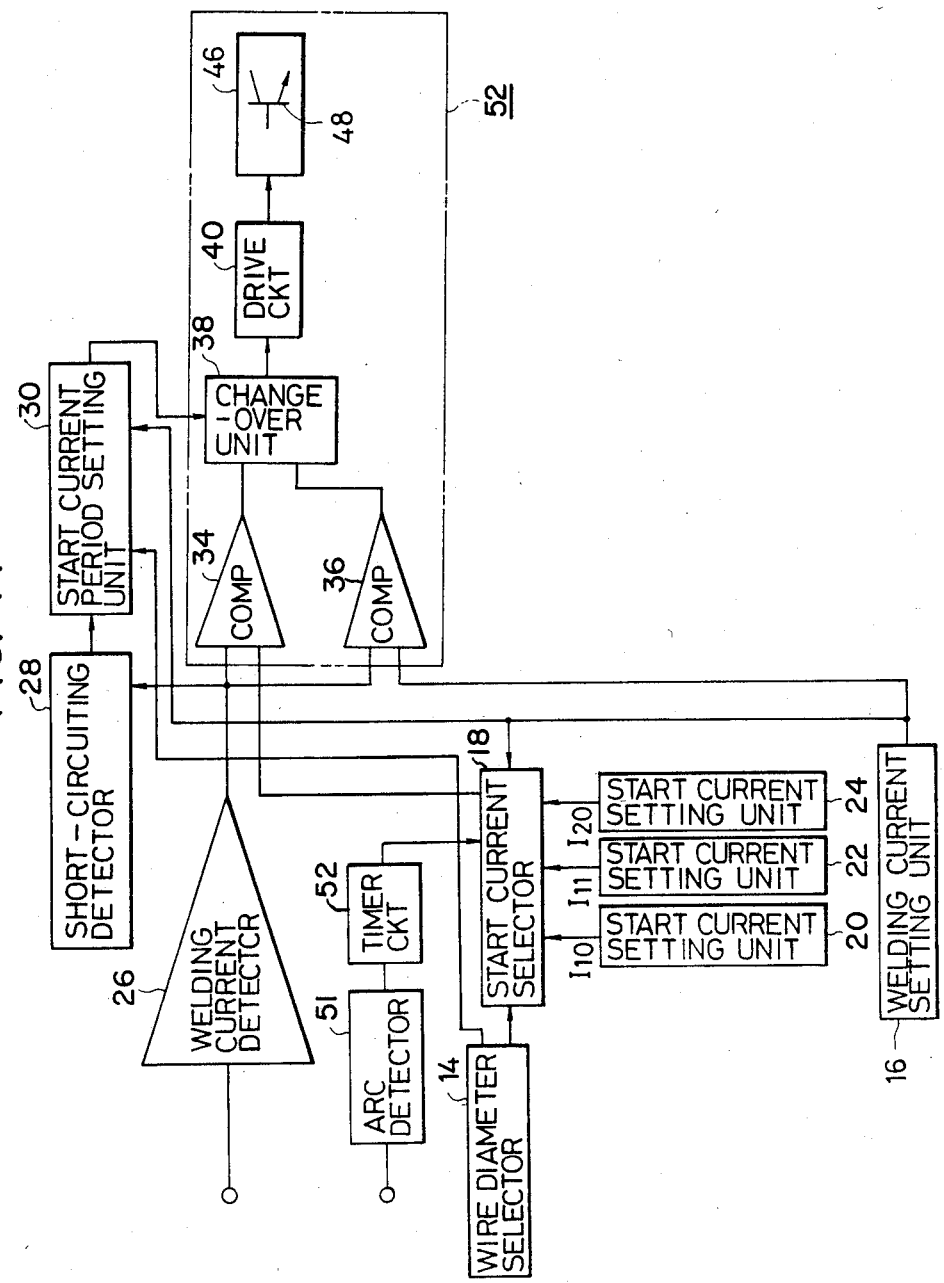
FIG. 14 is a block diagram of a second embodiment of a consumable electrode type arc welding apparatus of the present invention.

FIG. 14 shows a second embodiment of a consumable electrode type arc welding apparatus according to the invention.

The apparatus as shown in FIG. 14 includes a wire diameter selector 14 for selecting the diameter of a wire electrode 10 which is most suitable for a workpiece 12 to be welded. The welding current value is substantially proportional to the wire feeding speed. For instance, the higher the wire feeding speed, the larger the welding current value. Accordingly, the apparatus is provided with welding current setting unit 16 for setting the most suitable welding current value according to the wire feeding speed. In the apparatus, the wire selector 14 and the welding current setting unit are so designed that they are manually operated to determine such data before the welding operation is started.

Figure 15A:
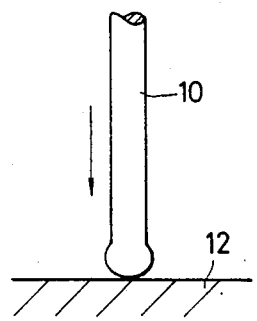
FIGS. 15(A), 15(B) and 16 are diagrams similar to those of FIGS. 6(A), 6(B) and 7 above but corresponding to the second embodiment illustrated in FIG. 14.

The apparatus further includes an arc detector 16 for detecting the production of arcing utilizing a welding voltage, and a timer circuit 20 for setting the arc detection time of the arc detector 50. The timer circuit 51 operates to set a period of time $\Delta T$ required for detecting the generation of arcing from the time instant $T_0$ at which the end of the wire electrode 10 is brought into contact with with the surface of the workpiece 12 as shown in FIG. 15(A). When arcing is generated during the period of time $\Delta T$, the arc detector 51 applies an arc detection signal through the timer circuit 20 to a start current selector 18.

The start current selector 18 operates to select a predetermined limited start current according to the welding conditions, wire diameter and welding current. When no arcing is present with the start current thus selected, the start current selector 22 selects another start current larger than the aforementioned start current. More specifically, the start current selector 18, according to the wire diameter and the welding current value determined respectively by the wire diameter selector 14 and the start welding current setting unit 16, selects the one of the start currents $I_{10}$ and $I_{11}$ set respectively by start current setting units 20 and 22 which is the most suitable for the then-present welding conditions (for instance, the start current $I_{10}$). When no arcing is generated with the start current $I_{10}$ selected by the start current selector 18, i.e., when the arc detector 50 provides no arc detection signal during the period of time $\Delta T$ set by the timer circuit 52, a start current setting unit 24 operates to select a start current larger than the start current $I_{10}$ selected previously.

The welding current is detected by a welding current detector 26, the output detection signal of which is applied to a short-circuiting detector 28. The short-circuiting detector 28 detects the occurrence of short-circuiting from the detection signal thus applied.

The apparatus further has a start current period setting unit 30 for setting a period of time for which the start current selected according to the welding conditions is allowed to flow. According to the wire diameter and the welding current value determined respectively by the wire diameter selector 14 and the welding current setting unit 16, the start current period setting unit 30 sets a start current period which is the most suitable for the welding conditions after the short-circuiting detector 28 has detected the occurrence of short-circuiting.

The start current value and the short-circuiting current period, which are chosen according to the welding conditions, are determined by taking the following into consideration: If the target value of the start current is large, then sputtering may occur which is so strong that the wire electrode is shattered as in the conventional apparatus. Therefore, the start current value should be set to the minimum value which produces arcing when the end of the wire electrode 10 is brought into contact with the surface of the workpiece 12. If the start current value is smaller than the minimum value, with the wire electrode 10 and the workpiece 12 short circuited, the start current flows continuously, as a result of which the wire electrode 10 is heated by resistance heating and sputtering occurs similar to the conventional apparatus. When the start current is limited to the minimum value which starts generating arcing, the arcing thus generated is unstable. Accordingly, in order to stabilize the unstable arcs without causing them to extinguish, the start current period should be a period of time during which the end portion of the wire electrode 10 is molten, without causing a great amount of sputtering, to allow the arcing to burn the wire electrode through a predetermined length to obtain a desired arc length, thereby to produce stable arcs over the entire end face of the wire electrode 10.

The apparatus further incorporates a start current control circuit 52 for allowing the limited start current to flow from the wire electrode 10 to the workpiece 12 at the start of arcing, and thereafter to obtain the steady state. The start current control circuit 52 includes a comparator 34 which receives the start current selected by the start current selector 22 and a current corresponding to the welding current detected by the welding current detector 26. The comparator 34 supplies a control current until the welding current reaches a selected current value. The start current control circuit 52 further includes a comparator 36 which receives a current corresponding to the welding current set by the welding current setting unit 16 and the current corresponding to the welding current detected by the welding current detector 26. The comparator supplies a control current until the welding current value reaches a preset welding current value.

In the start current control circuit 52, the output terminals of the comparators 34 and 36 are connected to a change-over unit 38 for switching between the arc start state and the steady state. At the start of arcing, the change-over unit 38 supplies the control current from the comparator 34 through a drive circuit 40 to a control circuit 42 for a period of time which is set by the start current period setting unit 30. During the steady operation provided by a switching action thereafter, the change-over unit 38 supplies the control current from the comparator 36 through the drive circuit 40 to the control circuit 40. In the arc welding apparatus in FIG. 14, the control circuit 42 controls the amount of current flowing in the base of a transistor 44, thereby to control the current which flows from the wire electrode 10 to the workpiece 12.

The operation of the arc welding apparatus in FIG. 14 will now be described.

Before the start of arcing, the wire diameter selector 14 is manually operated to select a wire diameter which is equal to the diameter of the wire electrode 10, and the welding current setting unit 16 is operated to set the welding current value which is the most suitable for the wire feeding speed.

Figure 16:
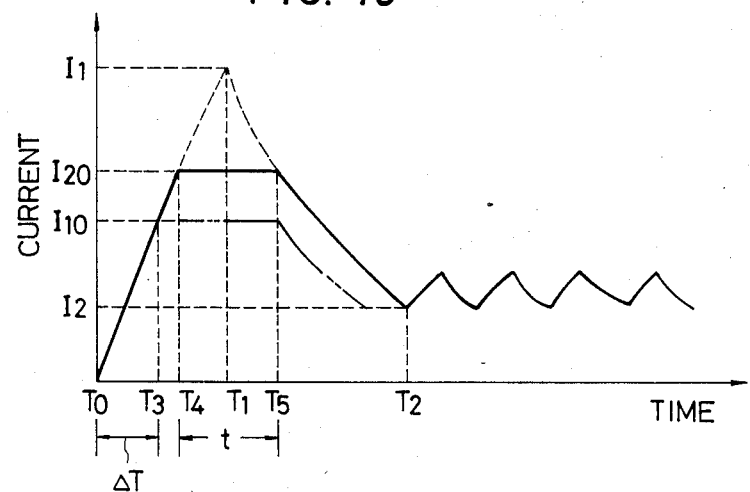

The wire electrode 10 having the diameter thus selected is fed to the workpiece at the predetermined speed until it is brought into contact with the surface of the workpiece 12, as shown in FIG. 15(A), to cause the start current to flow therebetween. At the start of arcing, according to the wire diameter and the welding current value which have been determined respectively by the wire diameter selector 14 and the welding current setting unit 16, the start current selector 18 selects the one of the start currents $I_{10}$ and $I_{11}$ which is the most suitable for these welding conditions (for instance the start current $I_{10}$), and supplies a selected current to the comparator 34 according to the selected start current $I_{10}$. The timer circuit 51 sets a period of time between the time instant $T_0$ at which the end of the wire electrode 10 is brought into contact with the surface of the workpiece 12 as shown in FIG. 15(A) and the time instant $T_3$ at which the selected start current flows; that is, the timer circuit 51 sets a period of time $\Delta T$ as indicated in FIG. 16 which is required for detecting the generation of small arcs and supplies the arc detection signal from the arc detector 50 to the start current selector for the period of time $\Delta T$. In response to the arc detection signal from the arc detector 50, the start current selector 18 selects a start current $I_{20}$ set by a start current setting units 24 ($I_{20} > I_{10}$) to supply a selected current to the comparator 34 according to the start current $I_{20}$ thus selected in the case where no small arcs are produced with the selected start current $I_{10}$. It should be noted that the start current $I_{20}$ set by the start current setting unit 24 has a value which can positively generate the small arcs.

The short-circuit detector 28 detects from the welding current detected by the welding current detector 26 the occurrence of short-circuiting between the wire electrode and the workpiece, and supplies the short-circuiting detection signal to the start current period setting unit 30. The comparator 34 compares the selected current from the start current selector 18 with the welding current from the welding current detector 26 and supplies the control current to the change-over unit 38 until the welding current becomes equal to the selected current. At the start of arcing, the change-over unit 38 is operated to supply the control current from the comparator 34 through the drive circuit 40 to the control circuit 42, and the transistor 48 in the control circuit 46, according to the current thus supplied, causes the selected start current $I_{20}$ to flow from the wire electrode 10 to the workpiece at the time instant $T_4$, as shown in FIG. 16. The start current period setting unit 30, according to the wire diameter and the welding current which have been determined respectively by the wire diameter selector 14 and the welding current setting unit 16, sets the start current period t which is the most suitable for these welding conditions, and applies a change-over holding signal to the change-over unit 38 until the time instant $T_4$ at which the flowing of the start current $I_{20}$ is suspended by the short-circuiting detection signal. Thus, the predetermined start current $I_{20}$ flows from the wire electrode 10 to the workpiece 12 for the period t between the time instants $T_4$ and $T_5$ as indicated by the solid line in FIG. 16. At the time instant $T_5$, the start current period setting unit 30 outputs a switching signal to the change-over unit 38 so that the latter is operated to supply the control signal from the comparator 36 through the drive circuit 40 to the control circuit 42. Thus, the arcing start state has been switched over to the steady state.

Figure 15B:
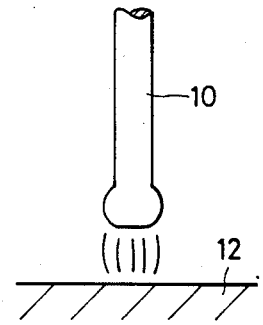

The comparator 36 compares the current corresponding to the welding current $I_2$ with the current corresponding to the welding current detected by the welding current detector 26, and supplies the control current through the drive circuit 40 to the control circuit 42 until the welding current becomes equal to the welding current $I_2$ set. Accordingly, the welding current $I_2$ thus set flows continuously from the wire electrode 10 to the workpiece 12, so that arcs having a predetermined arc length are generated between the entire end face of the wire electrode 10 and the workpiece 12 as shown in FIG. 15 (B).

As is apparent from the above description, in the arc welding apparatus of the invention, the start current value and the start current period are determined according to the diameter of the wire electrode and the welding current value. Therefore, in the inventive apparatus, unlike the conventional apparatus, sputtering will never occur, and the arc starting operation is positively achieved according to the welding conditions. Especially in the above-described second embodiment of the apparatus, the start current selector 18 is so designed that, when no small arcs are generated by the selected start current $I_{10}$, it selects the start current $I_{20}$ larger than the start current $I_{10}$. Therefore, with this apparatus, small arcs can positively be generated.

Figure 17:
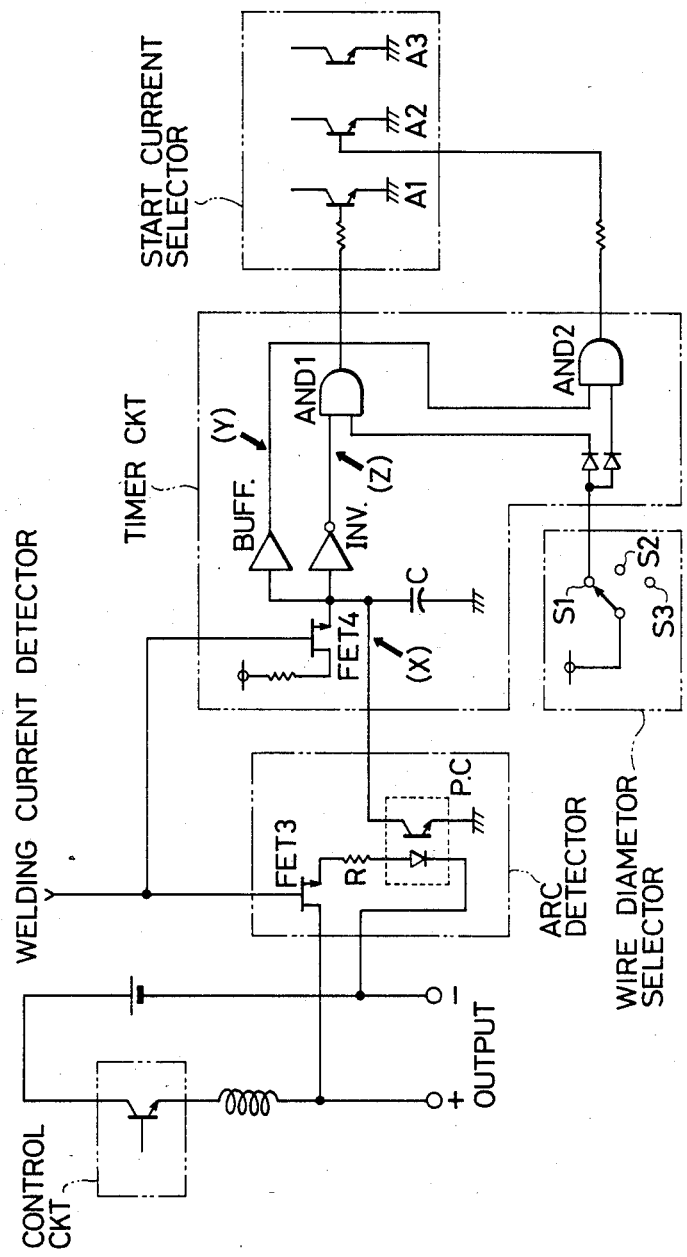
FIG. 17 is a detailed circuit diagram of portions of the apparatus of FIG. 14 which differ from the first embodiment of FIG. 5.
Figure 18:
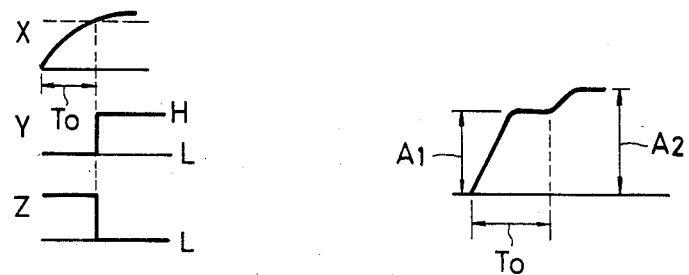
FIG. 18 is a waveform diagram used to explain the operation of the components shown in FIG. 17.

The parts of the apparatus shown in FIG. 14 which are different from those of the apparatus shown in FIG. 5 are illustrated in FIG. 17 in more detail, and their operations are as shown in FIG. 18.

The arc detector 50 is connected to an output terminal. When the welding current starts flowing, a field-effect transistor FET3 in the arc detector 50 is rendered conductive. When, under this condition, a voltage developed at the output terminal increases to a predetermined value, a current large enough to render the output transistor of a photocoupler PC conductive flows through a resistor R. Setting the resistance of the resistor R to a suitable value makes it possible to detect the occurrence of short-circuiting or the generation of arcs between the wire electrode and the workpiece.

When the wire electrode is brought into contact with the workpiece at the start of welding, the short-circuiting current flows therebetween, and the field-effect transistors FET3 and FET4 are rendered conductive. In this operation, as the output transistor of the photocoupler PC has been rendered nonconductive, the capacitor in the timer circuit is charged slowly. If the short-circuiting state remains, then the outputs of a buffer BUFF and an inverter INV are changed in a predetermined period of time $T_0$. When the outputs are changed in this manner, the short-circuiting current is changed from the condition A1 to the condition A2 in the start current selector. If the condition A2 is made larger than the condition A1 in advance, no arc is generated during the period of time $T_0$ from the time when the short-circuiting current starts flowing. Accordingly, unless the output of the arc detector, that is, the output of the photocoupler PC, varies from an OFF state to an ON state, the start current condition is changed from the small short-circuiting current to the large short-circuiting current.

Figure 19:
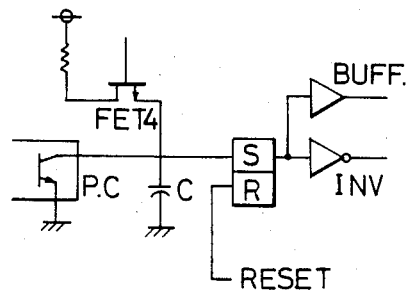
FIG. 19 is a circuit diagram of a buffer and inverter circuit.
Figure 20:
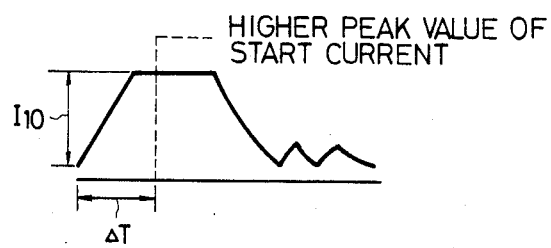
FIG. 20 is a waveform diagram illustrating the operation of the circuit of FIG. 19.

In the above-described apparatus, when no small arcs are generated with the selected start current $I_{10}$, the start current $I_{20}$ which is larger than the start current $I_{10}$ is selected, so that the start current $I_{20}$ thus selected is caused to flow continuously for the period of time t set by the start current period setting unit 30. However, the apparatus may be so designed that the start current $I_{10}$ is caused to flow again from the time instant $T_4$ at which the start current is increased to $I_{20}$ as indicated by the two-dot chain line in FIG. 16. This may be achieved by adding circuit elements as shown in FIG. 19 to the circuit shown in FIG. 17. In this case, the operation is as indicated in FIG. 20. In this modification, when no arcing is produced in a predetermined period of time ($\Delta T$ for instance) during the start current period, the peak value of the start current is increased. In FIG. 20, the one-dot chain line indicates the peak value thus increased. When an arc is generated while the start current is flowing, the lower peak value ($I_{10}$) is used again (i.e., immediately when arcing is produced during the start current period, the preceding start current value is used again).

In order to maintain the flow of the second start current even when arcs are generated during the start current period, a flip-flop circuit which is set when the capacitor C is charged to a predetermined voltage is provided in the front stage of the buffer BUFF and the inverter INV as shown in FIG. 19. In this case, even when arcing is generated after the first start current has been switched over to the second start current with the flip-flop circuit being set during the start current period, the flow of the second start current is maintained.

In the above-described second embodiment of an arc welding apparatus according to the invention, the start current selector 18 and the start current period setting unit 30 determine the start current and the start current period, respectively, according to the wire diameter and the welding current. However, they may be so designed as to determine such data according to only one of the welding conditions.

As is apparent from the above description, the second embodiment of an arc welding apparatus according to the invention includes the arc detector for detecting the generation of arcs from the welding voltage, the start current selector for selecting a predetermined limited start current according to the welding conditions and for selecting, when no arcs are generated with the start current thus selected, another start current larger than the start current, the start current period setting unit for setting a start current period according to the welding conditions, and the start current control circuit for supplying the predetermined limited start current to the workpiece and the wire electrode for the predetermined period of time at the start of arcing, whereby arcs can be positively generated and excessive generation of arcs can be prevented at the start.

We claim:

1. A consumable electrode type arc welding apparatus comprising:
    a wire electrode fed to a workpiece to be welded;
    a start current selector for selecting a predetermined limited start current according to predetermined welding conditions, said start current selector comprising means for selecting a best one of a plurality of start currents which have been set by a plurality of start current setting units;
    a welding current setting unit for setting a welding current;
    a welding current detector for detecting a welding current flowing to said wire electrode and said workpiece;
    a short-circuiting detector for detecting the occurrence of short-circuiting between said wire electrode and said workpiece and providing a detection signal accordingly;
    a start current period setting unit for setting a start current period according to said welding conditions in response to said detection signal from said short-circuiting detector; and
    a start current control circuit for supplying said start current selected by said start current selector to said wire electrode and said workpiece for a period of time set by said start current period setting unit at the start of arcing, and for supplying a welding current set by said welding current setting unit in response to a signal from said welding current detector.

2. The apparatus as claimed in claim 1, wherein said start current selector comprises means for selecting said start current in response to a signal from a wire diameter selector indicative of a wire electrode diameter.

3. The apparatus as claimed in claim 2, wherein said start current selector comprises means for selecting said start current in response to a signal from said welding current setting unit.

4. The apparatus as claimed in claim 1, wherein said short-circuiting detector comprises means for detecting when said wire electrode is brought into contact with said workpiece and outputting a detection signal accordingly.

5. The apparatus as claimed in claim 1, wherein said start current period setting unit comprises means for setting said start current period in response to a signal from said welding current setting unit.

6. The apparatus as claimed in claim 1, wherein said start current period setting unit comprises means for setting said start current period in response to a signal from a wire diameter selector adapted to select a wire electrode diameter.

7. The apparatus as claimed in claim 1, wherein said start current control circuit comprises:
    a change-over unit for switching between said start current and a steady welding current in response to a signal from said start current period setting unit; and
    a current supplying circuit for supplying said current thus selected by said change-over unit to said wire electrode and said workpiece.

8. The apparatus as claimed in claim 7, wherein said current supplying circuit comprises:
    a switching element contacted between said wire electrode and said workpiece; and
    a drive circuit for controlling the conduction of said switching element according to a signal from said changeover unit.

9. The apparatus as claimed in claim 8, wherein said switching element is a transistor.

10. The apparatus as claimed in claim 7, wherein said start current control circuit further comprises:
    a first comparator for comparing a detection signal provided by said welding current detector with said start current selected by said start current selector; and
    a second comparator for comparing said detection signal provided by said welding current detector with said steady welding current set by said welding current setting unit.

11. The apparatus as claimed in claim 10, wherein said first comparator supplies said start current to said change-over unit, and said second comparator supplies said welding current to said change-over unit.

12. A consumable electrode type arc welding apparatus comprising:
    a wire electrode fed to a workpiece to be welded;

a welding current setting unit for setting a welding current;

a welding current detector for detecting a welding current flowing to said wire electrode and said workpiece;

a short-circuiting detector for detecting the occurrence of short-circuiting between said wire electrode and said workpiece;

an arc detector for detecting the generation of arcing in response to a welding voltage;

a start current selector for selecting a predetermined limited start current according to predetermined welding conditions, and for selecting, when no arcing is generated with said start current thus selected, another start current larger than said predetermined limited start current in response to a signal from said arc detector;

a start current period setting unit for setting a start current period according to said welding conditions in response to a signal from said short-circuiting detector; and a start current control circuit for supplying said start current selected by said start current selector to said wire electrode and said workpiece for a period of time set by said start current period setting unit at the start of arcing, and for supplying a welding current set by said welding current setting unit in response to a signal from said welding current detector.

13. The apparatus as claimed in claim 12, wherein said start current selector comprises a timer circuit.

14. The apparatus as claimed in claim 13, wherein said timer circuit comprises means for selecting a start current larger than said start current which has been previously selected, when said arc detector provides no arc detection signal.

15. The apparatus as claimed in claim 14, wherein said timer circuit comprises means for selecting said previously selected start current again after said start current has become equal to said larger start current.

* * * * *